(12) United States Patent
Hwang et al.

(10) Patent No.: US 8,571,609 B2
(45) Date of Patent: Oct. 29, 2013

(54) WIRELESS POWER TRANSMISSION METHOD

(75) Inventors: Chan Soo Hwang, Yongin-si (KR); Eun Seok Park, Suwon-si (KR); Sang Wook Kwon, Seongnam-si (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 12/970,328

(22) Filed: Dec. 16, 2010

(65) Prior Publication Data

US 2011/0177787 A1 Jul. 21, 2011

(30) Foreign Application Priority Data

Jan. 15, 2010 (KR) ........................ 10-2010-0003828

(51) Int. Cl.
*H04B 1/38* (2006.01)
(52) U.S. Cl.
USPC ......... 455/573; 455/41.2; 455/41.3; 455/572; 455/574; 320/108; 320/106; 320/128; 320/107; 320/137; 307/104; 235/492; 342/42
(58) Field of Classification Search
USPC ......... 455/41.1, 574, 573, 572; 320/108, 106, 320/128, 107, 137; 307/104; 235/492; 342/42

See application file for complete search history.

(56) References Cited

U.S. PATENT DOCUMENTS

| | | | |
|---|---|---|---|
| 7,522,878 B2 * | 4/2009 | Baarman | 455/41.1 |
| 2005/0127868 A1 * | 6/2005 | Calhoon et al. | 320/108 |
| 2009/0039828 A1 * | 2/2009 | Jakubowski | 320/106 |
| 2009/0058361 A1 * | 3/2009 | John | 320/128 |
| 2009/0096413 A1 * | 4/2009 | Partovi et al. | 320/108 |

FOREIGN PATENT DOCUMENTS

| | | |
|---|---|---|
| KR | 10-2002-0013363 | 2/2002 |
| KR | 10-2005-0105199 | 11/2005 |
| KR | 10-0564256 | 3/2006 |
| WO | WO 2004/112215 | 12/2004 |

OTHER PUBLICATIONS

European Search Report issued on May 3, 2011, in counterpart European Application No. EP 11 15 0611 (8 pages).

* cited by examiner

*Primary Examiner* — April G Gonzales
(74) *Attorney, Agent, or Firm* — NSIP Law

(57) ABSTRACT

A wireless power transmission method is provided. The method includes exchanging information for wireless power transmission between a wireless power transmission device and a terminal, in order to determine a communication protocol.

20 Claims, 8 Drawing Sheets

WIRELESS POWER TRANSMISSION METHOD

CROSS-REFERENCE TO RELATED APPLICATION

This application claims the benefit under 35 U.S.C. §119 (a) of Korean Patent Application No. 10-2010-0003828, filed on Jan. 15, 2010, in the Korean Intellectual Property Office, the entire disclosure of which is incorporated herein by reference for all purposes.

BACKGROUND

1. Field

The following description relates to a wireless power transmission method, and more particularly, to a wireless power transmission method using a communication protocol between a terminal and a wireless power transmission device that transmits power to the terminal.

2. Description of Related Art

Portable electronic products have become widespread as the development of information technologies (IT) has increased. When considering characteristics of portable electronic products, battery performance of these portable electronic products is often a critical concern. While these portable electronic products as well as household appliances can function to wirelessly transmit data, they can only receive power through wired power lines.

Accordingly, wireless power transmission technologies for supplying power in a wireless manner have been studied.

To wirelessly transmit power from a wireless power transmission device to a terminal receiving the power, information used to transmit the power needs to be exchanged between the terminal and the wireless power transmission device.

Accordingly, there is a desire for a new protocol to exchange information and to enable power transmission between the terminal and the wireless power transmission device.

SUMMARY

In one general aspect, there is provided a method of a wireless power transmission device for wirelessly transmitting power to a terminal, the method comprising transmitting a Broadcast Message (BM) while the wireless power transmission device is in an idle state, receiving a connection request message from the terminal, and in response, transitioning from the idle state to a plug-in state, establishing a connection with the terminal, and in response, transitioning from the plug-in state to a power transmission state where the power is wirelessly transmitted to the terminal, and transitioning from the power transmission state to a plug-out state in which the connection to the terminal is terminated, when a charging completion message is received from the connected terminal.

The establishing may comprise authenticating the terminal, performing a matching operation with the terminal when the authentication of the terminal is successful, and wirelessly transmitting a test power to the terminal.

The authenticating may comprise receiving an authentication request message from the terminal, performing the authentication of the terminal in response to the authentication request message, and transmitting an authentication success message to the terminal, when the authentication of the terminal is successful.

The transitioning to the plug-in state may comprise transitioning from the idle state to the plug-in state when the authentication request message is received from the terminal.

The transitioning to the power transmission state may comprise transitioning from the plug-in state to the power transmission state, when the authentication of the terminal is successful.

The matching operation may comprise receiving a terminal information message from the terminal, transmitting a transmission information message to the terminal, and controlling a transmission parameter in response to the terminal information message.

The wireless transmitting may comprise receiving an efficiency information message from the terminal that includes information about a transmission efficiency of the test power which is wirelessly transmitted to the terminal, and transmitting a plug-in completion message to the terminal when the transmission efficiency is equal to or greater than a reference value.

The transitioning to the power transmission state may comprise transitioning from the plug-in state to the power transmission state, when the plug-in completion message is transmitted to the terminal.

In the power transmission state, the following operations may be performed, transmitting a transmission check message to the terminal at each check interval, and receiving, from the terminal, a state information message corresponding to the transmission check message.

While the wireless power transmission device is in the plug-out state, the method may further comprise transmitting a transmission report message to the terminal, and receiving an acknowledgement message in response to the transmission report message from the terminal.

The method may further comprise transitioning from the plug-out state to the idle state when the broadcast period elapses after the connection to the terminal is terminated.

While the wireless power transmission device is in the plug-in state, the method may further comprise transitioning to the idle state when the authentication of the terminal fails.

The wireless transmitting may further comprise transitioning to the idle state when the transmission efficiency is less than the reference value.

The method may further comprise transitioning to the idle state when a terminal interrupt message is received from the terminal in one of the plug-in state, the power transmission state, and the plug-out state.

The method may further comprise transmitting a source interrupt message to the terminal when an interrupt the wirelessly transmitting of the power occurs in one of the plug-in state, the power transmission state, and the plug-out state, and transitioning to the idle state.

The method may further comprise transitioning to the idle state when a time-out occurs in one of the plug-in state, the power transmission state, and the plug-out state.

In another aspect, there is provided a method of wirelessly transmitting a power, the method comprising transmitting a Broadcast Message (BM) at each broadcast period, authenticating a terminal that receives the BM, and wirelessly transmitting power to the terminal when the authentication of the terminal is successful.

The method may further comprise transmitting a transmission check message to the terminal at each check interval, and receiving, from the terminal, a state information message corresponding to the transmission check message.

The method may further comprise interrupting the wireless transmitting of the power when a charging completion message is received from the terminal.

The method may further comprise performing a matching operation with the terminal when the authentication of the terminal is successful.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

Figure 1:
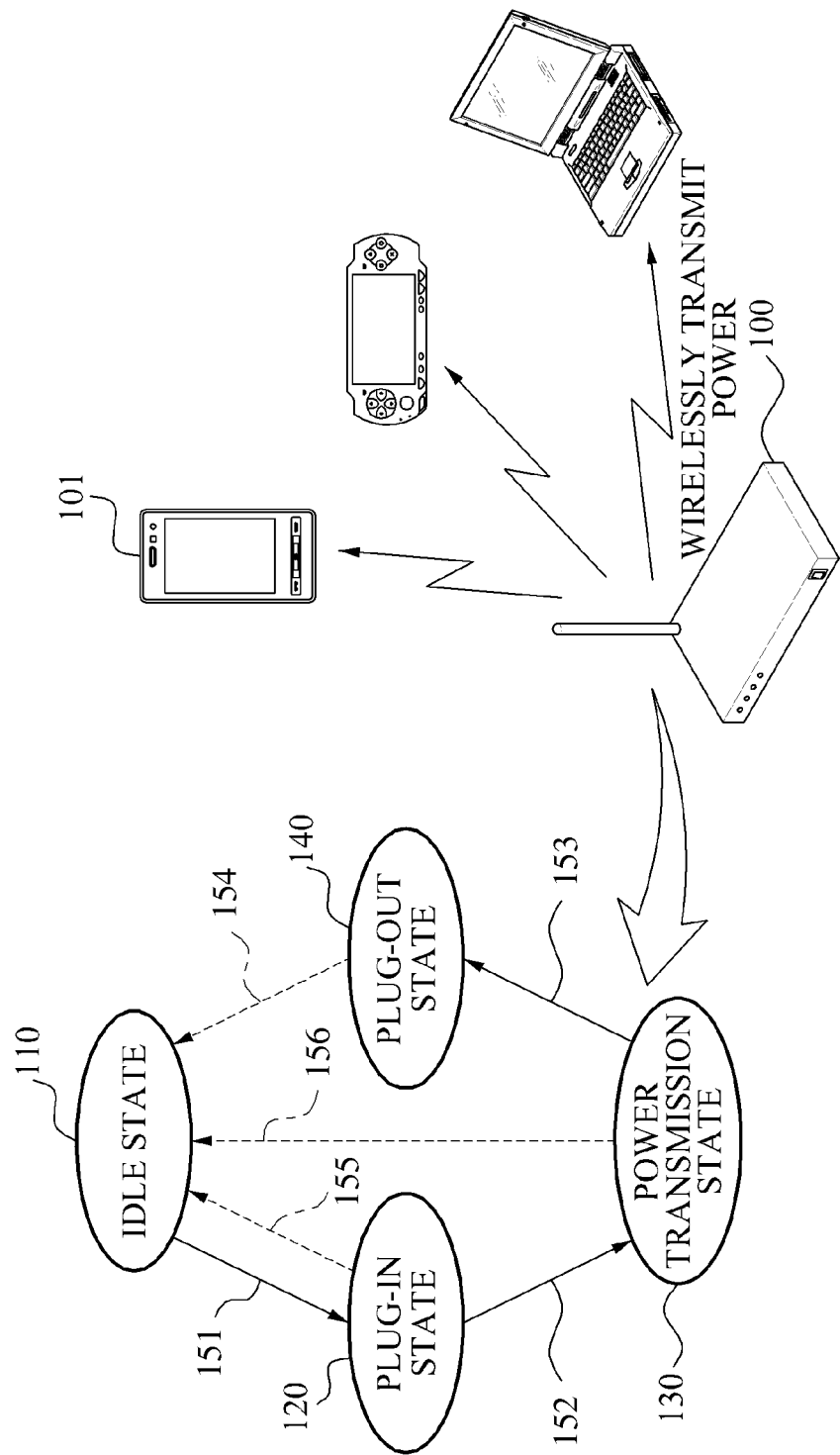
FIG. 1 is a diagram illustrating an example of a wireless power transmission system and a wireless power transmission method.

FIG. 1 illustrates an example of a wireless power transmission method.

The wireless power transmission method of FIG. 1 may be performed by a wireless power transmission device 100 to wirelessly transmit power to a terminal 101. Referring to the wireless power transmission method of FIG. 1, the wireless power transmission device 100 may be in at least one of an idle state 110, a plug-in state 120, a power transmission state 130, and a plug-out state 140.

In some embodiments, the wireless power transmission device 100 may be installed as a module in the terminal 101.

While in the idle state 110, the wireless power transmission device 100 may transmit a Broadcast Message (BM) to the terminal 101 every broadcast period.

The BM may include, for example, an identifier of the wireless power transmission device 100, an identifier of a protocol used to perform communication and transmission between the wireless power transmission device 100 and the terminal 101, authentication information used to authenticate the terminal 101, and safety information related to a wireless power transmission. According to various embodiments, the authentication information may include Authentication, Authorization, Accounting (AAA) information. The safety information may include information regarding a maximum current, a voltage, and a frequency of the wireless power transmission device 100.

The idle state 110 and the BM are further described with reference to FIG. 2.

According to the wireless power transmission method of FIG. 1, when a connection request message is received from the terminal 101 in response to a BM, in 151 the wireless power transmission device 100 may transition from the idle state 110 to the plug-in state 120 in operation.

While in the plug-in state 120, the wireless power transmission device 100 may connect to the terminal 101.

For example, the terminal 101 may receive the BM from the wireless power transmission device 100, and may transmit the connection request message to the wireless power transmission device 100 in response to the BM. In this example, the connection request message may be used to request the wireless power transmission device 100 to wirelessly transmit power to the terminal 101. To connect to the terminal 101, the wireless power transmission device 100 may transition from the idle state 110 to the plug-in state 120. The plug-in state 120 is further described with reference to FIG. 3.

When the connection to the terminal 101 is established, the wireless power transmission device 100 may transition from the plug-in state 120 to the power transmission state 130, in 152.

While in the power transmission state 130, the wireless power transmission device 100 may wirelessly transmit power to the terminal 101 that is connected to the wireless power transmission device 100. The power transmission state 130 is further described with reference to FIG. 4.

When a charging completion message is received from the terminal 101, the wireless power transmission device 100 may transition from the power transmission state 130 to the plug-out state 140, in 153.

While in the plug-out state 140, the connection to the terminal 101 may be terminated. For example, the terminal 101 may be disconnected from the wireless power transmission device 100. The plug-out state 140 is further described with reference to FIG. 5.

When the broadcast period elapses after the terminal 101 is disconnected from the wireless power transmission device 100, the wireless power transmission device 100 may transition from the plug-out state 140 to the idle state 110, in 154.

When a time-out occurs in either of the plug-in state 120, the power transmission state 130, and the plug-out state 140, the wireless power transmission device 100 may transition to the idle state in 154, 155, or 156.

For example, the time-out may occur when the terminal 101 does not respond to a message transmitted from the wireless power transmission device 100 in the plug-in state 120, the power transmission state 130, or the plug-out state 140. As another example, the time-out may occur when the wireless power transmission device 100 does not respond to any message transmitted from the terminal 101 in the plug-in state 120, the power transmission state 130, or the plug-out state 140.

In some embodiments, information about the time-out may be input to the wireless power transmission device 100, for example, the time at which the time-out is taken, the duration of the time-out, and the like.

Figure 2:
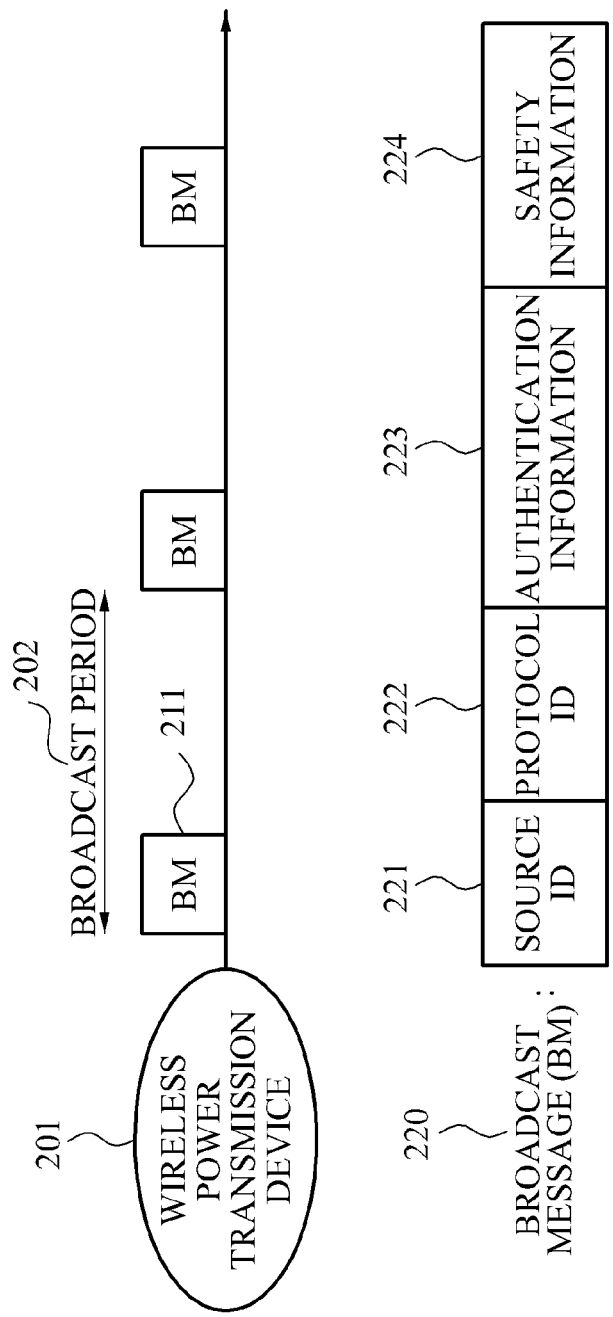
FIG. 2 is a diagram illustrating an example of a wireless power transmission method in an idle state, and an example of a message related to the idle state.

FIG. 2 illustrates an example of a wireless power transmission method in an idle state, and an example of a message related to the idle state.

Referring to FIG. 2, in the idle state, a wireless power transmission device 201 may transmit a BM 220 every broadcast period 202, in 211. The broadcast period 202 may be input to the wireless power transmission device 201. The BM 220 may include, for example, a source Identification (ID) 221, a protocol ID 222, authentication information 223, and safety information 224, as shown in FIG. 2.

The source ID 221 may be used, for example, as an identifier of the wireless power transmission device 201 to identify a unique ID of the wireless power transmission device 201. For example, when the BM 220 is received from the wireless power transmission device 201, a terminal may identify the wireless power transmission device 201 that transmitted the BM 220, based on the source ID 221.

The protocol ID 222 may be used, for example, to identify a unique ID of a protocol used to perform communication and transmission between the wireless power transmission device 201 and a terminal that is to receive power. The protocol ID 222 may be an identifier of the protocol for communication and transmission between the wireless power transmission device 201 and the terminal. For example, when a terminal receives the BM 220 from the wireless power transmission device 201, the terminal may determine how to communicate with and transmit a message to the wireless power transmission device 201, based on the protocol ID 222.

The authentication information 223 may include, for example, information used to authenticate a terminal that is to wirelessly receive power from the wireless power transmission device 201. The authentication information 223 may include AAA information. For example, when a terminal enters the transmission range of the wireless power transmission device 201, the terminal may transmit information corresponding to the authentication information 223 to the wireless power transmission device 201. Upon authorization the terminal is able to wirelessly receive power from the wireless power transmission device 201.

The safety information 224 may be related to the wireless power transmission, and may include, for example, information regarding a maximum current, a voltage, and a frequency of the wireless power transmission device 201.

Figure 3:
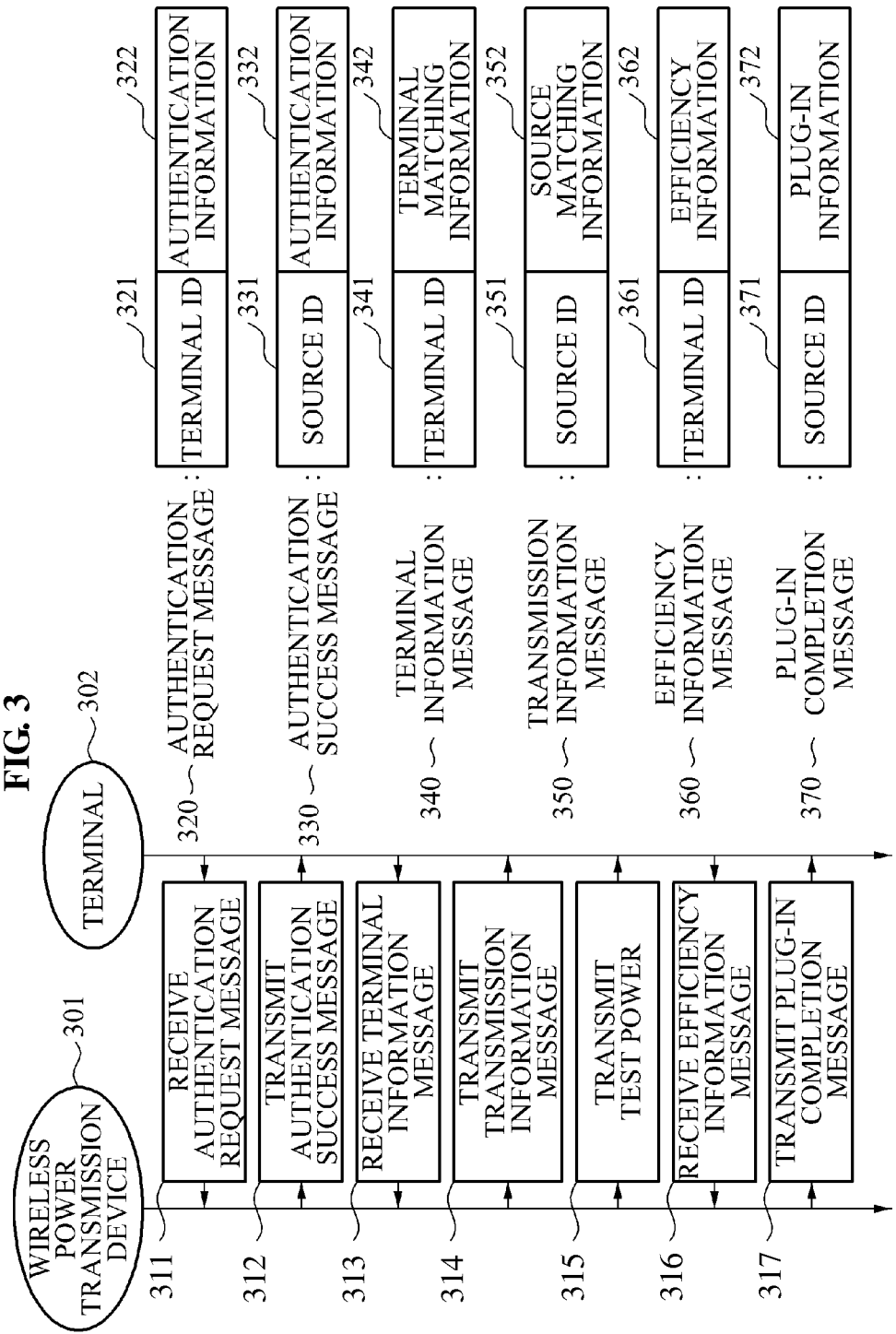
FIG. 3 is a diagram illustrating an example of a wireless power transmission method in a plug-in state, and examples of messages related to the plug-in state.

FIG. 3 illustrates an example of a wireless power transmission method in a plug-in state, and examples of messages related to the plug-in state.

Referring to FIG. 3, in the plug-in state, a wireless power transmission device 301 may receive an authentication request message 320 from a terminal 302, in 311. In this example, the terminal 302 may be within a transmission range of the wireless power transmission device 301.

The terminal 302 may receive a BM from the wireless power transmission device 301 in the idle state. In response to receiving the BM the terminal 302 may transmit the authentication request message 320 to the wireless power transmission device 301. After receiving the authentication request message 320 from the terminal 302, the wireless power transmission device 301 may transition from the idle state to the plug-in state.

For example, the authentication request message 320 may include a terminal ID 321 and authentication information 322. The terminal ID 321 may be used to identify a unique ID of the terminal 302. The authentication information 322 may correspond to information included in the BM received from the wireless power transmission device 301, and may include information used to authenticate the terminal 302.

While in the plug-in state, the wireless power transmission device 301 may authenticate the terminal 302, in response to the authentication request message 320 from the terminal 302. When the authentication of the terminal 302 is successful, the wireless power transmission device 301 may transmit an authentication success message 330 to the terminal 302, in 312.

When the authentication of the terminal 302 is successful, the wireless power transmission device 301 may transition from the plug-in state to the power transmission state. Alternatively, when the authentication of the terminal 302 fails, the wireless power transmission device 301 may transition from the plug-in state to the idle state.

The authentication success message 330 may include, for example, a source ID 331 and authentication information 332. The source ID 331 may be used to identify a unique ID of the wireless power transmission device 301. The authentication information 332 may include information related to the authentication of the terminal 302.

While in the plug-in state, the wireless power transmission device 301 may receive a terminal information message 340 from the terminal 302, in 313. For example, a matching operation may be performed based on the terminal information message 340, to wirelessly transmit power to the terminal 302. While in the plug-in state, a transmission parameter of the wireless power transmission device 301 may be controlled in response to the terminal information message 340.

The terminal information message 340 may include, for example, a terminal ID 341 and terminal matching information 342. The terminal ID 341 may be used to identify the unique ID of the terminal 302. The terminal matching information 342 may include, for example, information regarding a parameter of the terminal 302. The parameter of the terminal 302 may be used to perform the matching operation to wirelessly receive the power from the wireless power transmission device 301. For example, the terminal matching information 342 may include information regarding at least one of an impedance, a power capacity, a current level, and a voltage level of the terminal 302.

Accordingly, the terminal information message 340 may include, for example, information regarding at least one of an identifier, the impedance, the power capacity, the current level, and the voltage level of the terminal 302.

While in the plug-in state, the wireless power transmission device 301 may transmit a transmission information message 350 to the terminal 302, in 314. The terminal 302 may receive the transmission information message 350 from the wireless power transmission device 301. In addition, the terminal 302 may perform the matching operation with the wireless power transmission device 301 based on the received transmission information message 350.

The transmission information message 350 may include, for example, a source ID 351 and source matching information 352. The source ID 351 may be used to identify the unique ID of the wireless power transmission device 301. The source matching information 352 may include information regarding a parameter of the wireless power transmission device 301. For example, the parameter of the wireless power transmission device 301 may be used to perform the matching operation to wirelessly transmit the power to the terminal 302. The source matching information 352 may include, for example, information regarding at least one of an impedance, a current level, a voltage level of the wireless power transmission device 301, a distance between the wireless power transmission device 301 and the terminal 302, and an angle between the wireless power transmission device 301 and the terminal 302.

Accordingly, the transmission information message 350 may include, for example, information regarding at least one of an identifier, the impedance, the current level, the voltage level of the wireless power transmission device 301, the distance between the wireless power transmission device 301 and the terminal 302, and the angle between the wireless power transmission device 301 and the terminal 302.

While in the plug-in state, the wireless power transmission device 301 may transmit a test power to the terminal 302, in 315. For example, the test power may be transmitted to the terminal 302 depending on a result of the matching operation.

The wireless power transmission device 301 may receive, from the terminal 302, an efficiency information message 360 regarding a transmission efficiency of the test power wirelessly transmitted to the terminal 302, in 316.

The efficiency information message 360 may include, for example, a terminal ID 361 and efficiency information 362. The terminal ID 361 may be used to identify the unique ID of the terminal 302. The efficiency information 362 may relate to the transmission efficiency of the test power wirelessly transmitted to the terminal 302. For example, the efficiency information 362 may be represented by a percentage value.

When the transmission efficiency is equal to or greater than a reference value, the wireless power transmission device 301 may transmit a plug-in completion message 370 to the terminal 302, in 317. The plug-in completion message 370 may include, for example, a source ID 371 and plug-in information 372. The source ID 371 may be used to identify the unique ID of the wireless power transmission device 301. The plug-in information 372 may indicate that the connection to the terminal 302 is established.

For example, when the transmission efficiency is less than the reference value, the wireless power transmission device 301 may transition from the plug-in state to the idle state. Accordingly, after transmitting the plug-in completion message 370 to the terminal 302, the wireless power transmission device 301 may transition from the plug-in state to the power transmission state.

While in the plug-in state, the authentication of the terminal 302 may be performed. When the authentication of the terminal 302 is successful, the wireless power transmission device 301 may perform the matching operation with the terminal 302. Accordingly, the wireless power transmission device 301 may wirelessly transmit a test power to the terminal 302.

Figure 4:
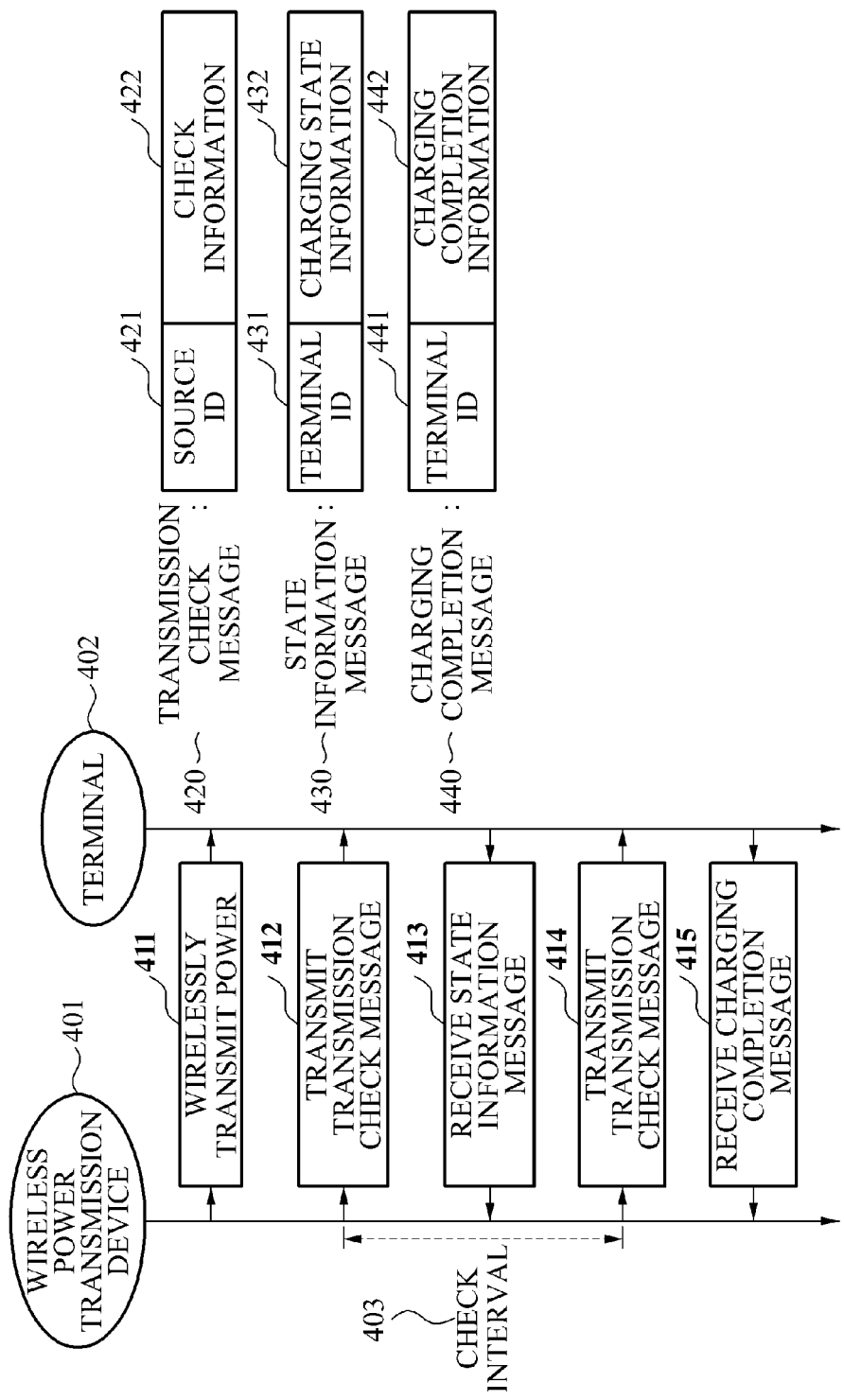
FIG. 4 is a diagram illustrating an example of a wireless power transmission method in a power transmission state, and examples of messages related to the power transmission state.

FIG. 4 illustrates an example of a wireless power transmission method in a power transmission state, and examples of messages related to the power transmission state.

Referring to FIG. 4, in the power transmission state, a wireless power transmission device 401 may wirelessly transmit power to a terminal 402, in 411. In this example, the wireless power transmission device 401 is connected to the terminal 402.

The wireless power transmission device 401 may transmit a transmission check message 420 to the terminal 402 at each check interval 403, in 412. The check interval 403 may be input through the wireless power transmission device 401. The transmission check message 420 may include, for example, a source ID 421 and check information 422. The source ID may be used to identify a unique ID of the wireless power transmission device 401.

The check information 422 may include information requested by the wireless power transmission device 401. The requested information may include, for example, information regarding an efficiency of the power wirelessly transmitted to the terminal 402, information regarding a current charging rate of the terminal 402, and information regarding a current location of the terminal 402.

After receiving the transmission check message 420 from the wireless power transmission device 401, the terminal 402 may generate a state information message 430 corresponding to the received transmission check message 420, and may transmit the generated state information message 430 to the wireless power transmission device 401. The state information message 430 may include, for example, information regarding a charging state of the terminal 402.

In the power transmission state, the wireless power transmission device 401 may receive the state information message 430 corresponding to the transmission check message 420 from the connected terminal 402, in 413.

The state information message 430 may include, for example, a terminal ID 431 and charging state information 432. The terminal ID 431 may be used to identify a unique ID of the terminal 402. The charging state information 432 may be information regarding a state where the terminal 402 wirelessly receives a power from the connected wireless power transmission device 401. For example, the charging state information 432 may include information about a power capacity, a current level, and a voltage level, of the terminal 402.

Accordingly, the state information message 430 may include, for example, information regarding at least one of an identifier, the power capacity, the current level, and the voltage level of the terminal 402.

In the power transmission state, after receiving the state information message 430 from the terminal 402, the wireless power transmission device 401 may determine that the terminal 402 has not been fully charged. Accordingly, the wireless power transmission device 401 may determine that there is a demand to continue to transmit power to the terminal 402. In this example, when the check interval 403 elapses after the transmission check message 420 is transmitted, the wireless power transmission device 401 may re-transmit the transmission check message 420 to the terminal 402, in 414.

When charging of the terminal 402 is completed, the terminal 402 may transmit a charging completion message 440 to the wireless power transmission device 401 in response to receiving the transmission check message 420. In the power transmission state, the wireless power transmission device 401 may receive the charging completion message 440 from the terminal 402, in 415.

The charging completion message 440 may include, for example, a terminal ID 441 and charging completion information 442. The terminal ID 441 may be used to identify the unique ID of the terminal 402. The charging completion information 442 may indicate that the terminal 402 is fully charged.

Accordingly, when the charging completion message 440 is received from the terminal 402, the wireless power transmission device 401 may transition from the power transmission state to the plug-out state.

Figure 5:
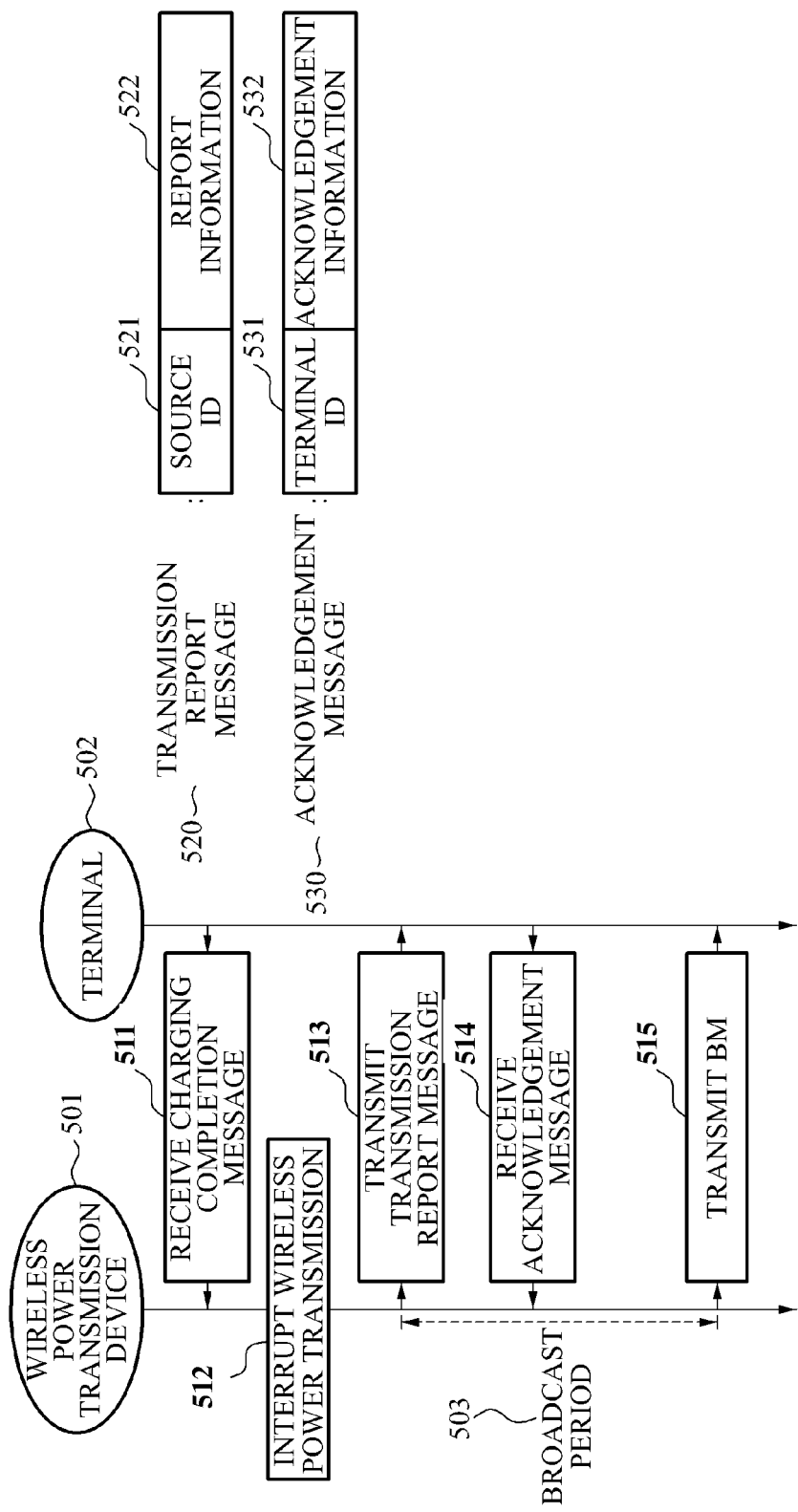
FIG. 5 is a diagram illustrating an example of a wireless power transmission method in a plug-out state, and examples of messages related to the plug-out state.

FIG. 5 illustrates an example of a wireless power transmission method in a plug-out state, and examples of messages related to the plug-out state.

Referring to FIG. 5, in the plug-out state, a wireless power transmission device 501 may receive a charging completion message from a terminal 502, in 511.

In response to the charging completion message, the wireless power transmission device 501 may interrupt a wireless power transmission, in 512.

After interrupting the wireless power transmission, the wireless power transmission device 501 may transmit a transmission report message 520 to the terminal 502, in 513.

The transmission report message 520 may include, for example, information regarding the wireless power transmission to the terminal 502. The transmission report message 520 may include, for example, a source ID 521 and report information 522. The source ID 521 may be used to identify a unique ID of the wireless power transmission device 501. The report information 522 may include information associated with the wireless power transmission to the terminal 502, for example, information about a total amount of power wirelessly transmitted to the terminal 502, the amount of time taken for wirelessly transmitting the power to the terminal 502, and a transmission efficiency of the power wirelessly transmitted to the terminal 502.

In the plug-out state, the wireless power transmission device 501 may receive an acknowledgement message 530 corresponding to the transmission report message 520 from the terminal 502, in 514.

The acknowledgement message 530 may include, for example, a terminal ID 531 and acknowledgement information 532. The terminal ID 531 may be used to identify a unique ID of the terminal 502. The acknowledgement information 532 may verify that the terminal 502 received the transmission report message 520.

Accordingly, when the transmission report message 520 is transmitted to the terminal 502, the wireless power transmission device 501 may transition from the plug-out state to the idle state. Subsequently, when a broadcast period 503 elapses after the transmission report message 520 is transmitted to the terminal 502, the wireless power transmission device 501 may transmit a BM to the terminal 502, in 515.

In some embodiments, when the broadcast period 503 elapses after the connection to the terminal 502 is terminated, the wireless power transmission device 501 may transition from the plug-out state to the idle state. In this example, the wireless power transmission device 501 may transmit a BM to the terminal 502.

In some embodiments, when the wireless power transmission to the terminal 502 is interrupted, the wireless power transmission device 501 may transition from the plug-out state to the idle state. In this example, when the broadcast period 503 elapses after interruption of the wireless power transmission to the terminal 502, the wireless power transmission device 501 may transmit a BM to the terminal 502.

Figure 6:
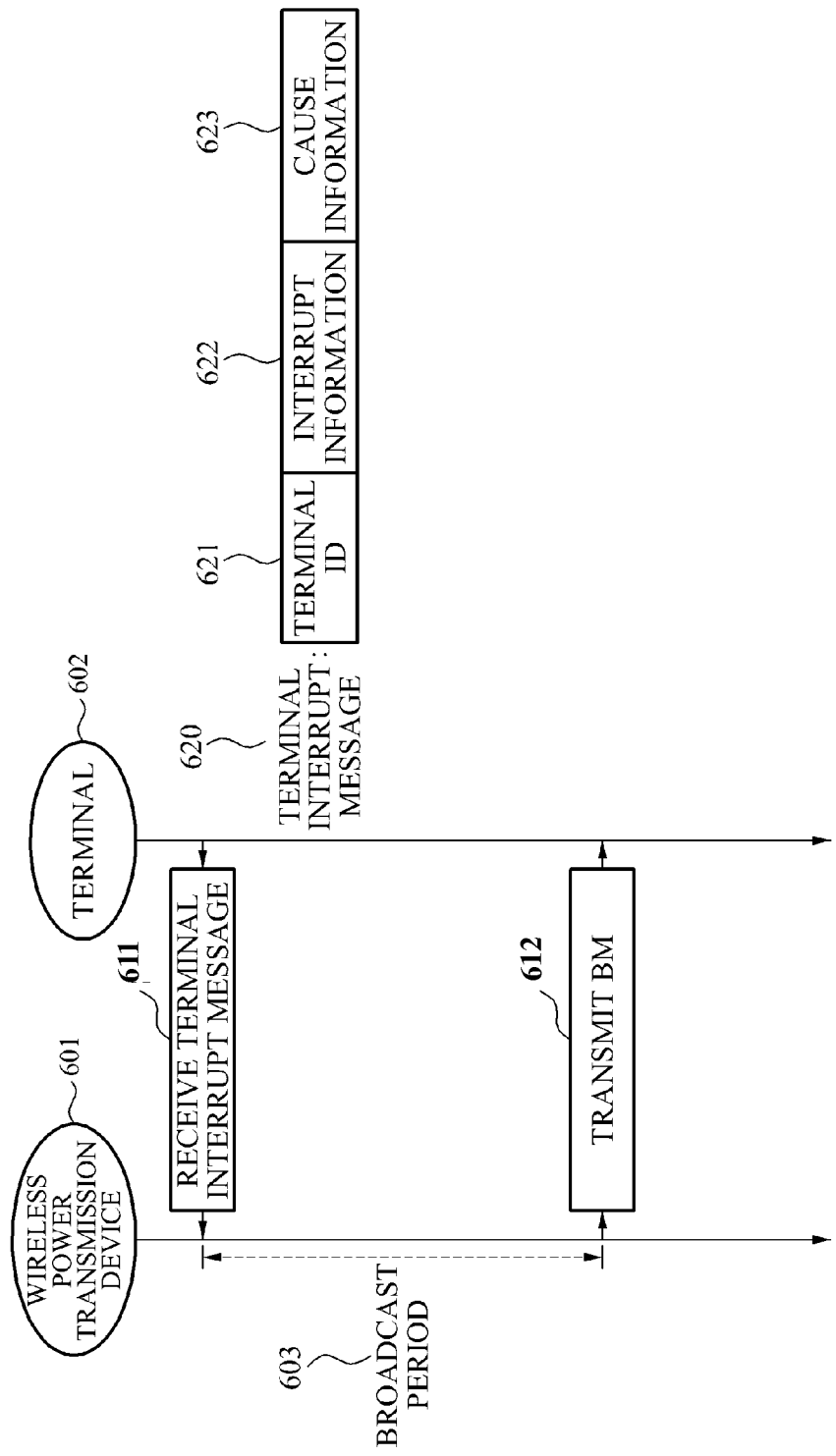
FIG. 6 is a diagram illustrating an example of an operation in which a wireless power transmission device transitions to the idle state when a terminal causes an interruption to a wireless power transmission, and an example of a terminal interrupt message.

FIG. 6 illustrates an example of an operation in which a wireless power transmission device transitions to the idle state when a terminal causes an interruption to a wireless power transmission, and an example of a terminal interrupt message.

Referring to FIG. 6, in one of the plug-in state, the power transmission state, and the plug-out state, the wireless power transmission device 601 may receive the terminal interrupt message 620 from the terminal 602, in 611.

When the terminal interrupt message 620 is received in the plug-in state, the wireless power transmission device 601 may interrupt a connection to the terminal 602. When the terminal interrupt message 620 is received in the power transmission state, the wireless power transmission device 601 may interrupt a wireless power transmission to the terminal 602.

When the terminal interrupt message 620 is received in one of the plug-in state, the power transmission state, and the plug-out state, the wireless power transmission device 601 may transition to the idle state. In this example, when a broadcast period 603 elapses after the terminal interrupt message 620 is received, the wireless power transmission device 601 may transmit a BM to the terminal 602, in 612.

The terminal interrupt message 620 may include, for example, a terminal ID 621, interrupt information 622, and cause information 623. The terminal ID 621 may be used to identify a unique ID of the terminal 602. The interrupt information 622 may include information used when the terminal 602 requests the wireless power transmission device 601 to interrupt the wireless power transmission.

The cause information 623 may be information regarding a cause for the terminal 602 to be unable to wirelessly receive the power. The cause information 623 may include, for example, information about the terminal 602 when it has moved out of a power transmission range of the wireless power transmission device 601, and information about when a user of the terminal 602 interrupts charging of the terminal 602.

Figure 7:
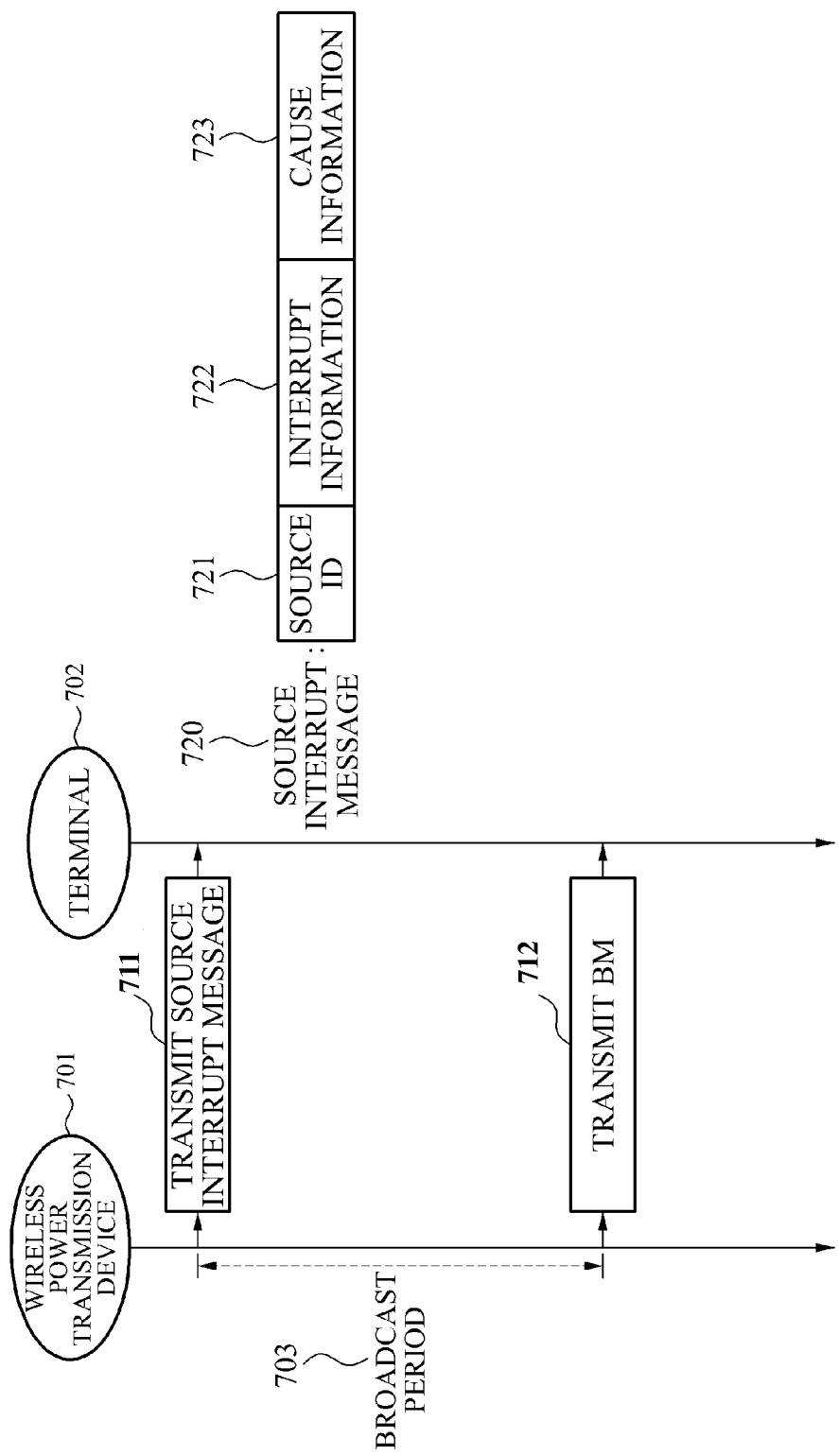
FIG. 7 is a diagram illustrating an example of an operation in which a wireless power transmission device transitions to the idle state when the wireless power transmission device causes an interruption to a wireless power transmission, and an example of a source interrupt message.

FIG. 7 illustrates an example of an operation in which a wireless power transmission device transitions to the idle state when the wireless power transmission device causes an interruption to a wireless power transmission to a terminal, and illustrates an example of a source interrupt message.

Referring to FIG. 7, in one of the plug-in state, the power transmission state, and the plug-out state, when an interrupt of the wireless power transmission occurs, the wireless power transmission device 701 may transmit the source interrupt message 720 to the terminal 702, in 711.

When the source interrupt message 720 is transmitted in the plug-in state, the wireless power transmission device 701 may interrupt a connection to the terminal 702. When the source interrupt message 720 is transmitted in the power transmission state, the wireless power transmission device 701 may interrupt the wireless power transmission to the terminal 702.

When the source interrupt message 720 is transmitted in one of the plug-in state, the power transmission state, and the plug-out state, the wireless power transmission device 701 may transition to the idle state. In this example, when a broadcast period 703 elapses after the source interrupt message 720 is transmitted, the wireless power transmission device 701 may transmit a BM to the terminal 702, in 712.

The source interrupt message 720 may include, for example, a source ID 721, interrupt information 722, and cause information 723. The source ID 721 may be used to identify a unique ID of the wireless power transmission device 701. The interrupt information 722 may include information indicating that the wireless power transmission device 701 interrupts the wireless power transmission to the terminal 702.

The cause information 723 may include information about why the wireless power transmission device 701 is not able to wirelessly transmit the power to the terminal 702. The cause information 723 may include, for example, information that a storage capacity of the wireless power transmission device 701 is exhausted, interference information from a third party that is detected during the wireless power transmission to the terminal 702, and the like.

Figure 8:
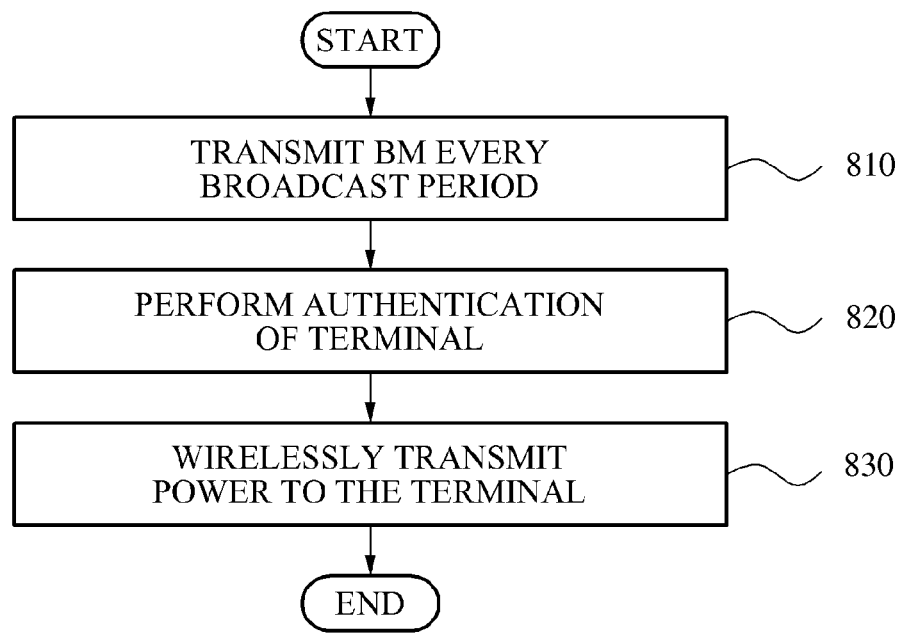
FIG. 8 is a flowchart illustrating a wireless power transmission method.

FIG. 8 illustrates an example of a wireless power transmission method.

Referring to FIG. 8, a BM may be transmitted every broadcast period, in 810. The BM has been described above with reference to FIGS. 1 and 2, and accordingly, further description thereof is omitted herein.

A terminal that receives the BM, may be authenticated, in 820. To perform the authentication of the terminal, an authentication request message may be received from the terminal. For example, when the terminal receives the BM, the terminal may transmit the authentication request message to a wireless power transmission device. The authentication request message may include information that is used to perform the authentication of the terminal and that corresponds to authentication-related information contained in the BM.

In response to the authentication request message, the terminal may be authenticated. When the authentication of the terminal is successful, an authentication success message may be transmitted to the terminal. The authentication request message and the authentication success message are described above with reference to FIG. 3, and accordingly, further description thereof is omitted.

When the authentication of the terminal fails, the BM may be re-transmitted at each broadcast period. When the authentication of the terminal is successful, a matching operation between the terminal and the wireless power transmission device may be performed. To perform the matching operation, a terminal information message may be received from the terminal.

In response to receiving the terminal information message, various transmission parameters of the terminal and of the wireless power transmission device may be controlled. A transmission information message may be transmitted to the terminal. The terminal may receive the transmission information message and may perform the matching operation based on the transmission information message. For example, the terminal may control an internal impedance to perform the matching operation.

The terminal information message and the transmission information message are described above with reference to FIG. 3, and accordingly, further description thereof is omitted.

When the authentication of the terminal succeeds, the power may be wirelessly transmitted to the terminal, in 830.

In some embodiments, a test power may be wirelessly transmitted to the terminal. For example, after transmitting the test power to the terminal, an efficiency information message regarding the transmission efficiency of the test power may be received from the terminal. The efficiency information message is described above with reference to FIG. 3, and accordingly, further description thereof is omitted.

For example, when the transmission efficiency is equal to or greater than the reference value, the test power may be wirelessly transmitted to the terminal. Alternatively, when the transmission efficiency is less than the reference value, a connection to the terminal may be terminated. After a broadcast period elapses, the connection to the terminal may be terminated and the BM may be re-transmitted.

When the power is wirelessly transmitted to the terminal, a transmission check message may also be transmitted to the terminal at each check interval. After receiving the transmission check message, the terminal may generate a state information message corresponding to the transmission check message, and may transmit the generated state information message to the wireless power transmission device. The state information message may include information about the charging state of the terminal.

The state information message corresponding to the transmission check message may be received from the terminal. The transmission check message and the state information message are described above with reference to FIG. 4, and accordingly, further description thereof is omitted.

When charging of the terminal is completed, the terminal may transmit a charging completion message to the wireless power transmission device, in response to the transmission check message. When the charging completion message is received from the terminal, the wireless power transmission device may interrupt the wireless power transmission to the terminal.

After interrupting the wireless power transmission, the wireless power transmission device may transmit a transmission report message to the terminal. Also, the wireless power transmission device may receive an acknowledgement message corresponding to the transmission report message from the terminal. The transmission report message and the acknowledgement message are described above with reference to FIG. 5, and accordingly, further description thereof is omitted.

When a terminal interrupt message is received from the terminal, the wireless power transmission to the terminal may be interrupted. When a broadcast period elapses after the wireless power transmission to the terminal is interrupted, a BM may be transmitted to the terminal.

The cause of the interrupt to the wireless power transmission may be transmitted to the terminal in a source interrupt message. The terminal interrupt message and the source interrupt message are described above with reference to FIGS. 6 and 7, and accordingly, further description thereof is omitted. When the source interrupt message is transmitted, the wireless power transmission to the terminal may be interrupted. When the broadcast period elapses after the wireless power transmission to the terminal is interrupted, the BM may be transmitted.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The above-described methods may be recorded in a computer-readable storage media including program instructions to implement various operations embodied by a computer. The media may also include, alone or in combination with the program instructions, data files, data structures, and the like. Examples of computer-readable storage media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random-access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of a wireless power transmission device for wirelessly transmitting power to a terminal, the method comprising:
    transmitting a Broadcast Message (BM) while the wireless power transmission device is in an idle state;
    receiving a connection request message from the terminal, and in response, transitioning from the idle state to a plug-in state;
    transmitting a test power to the terminal, and in response, receiving an efficiency information message comprising a comparison to an amount of the test power transmitted by the wireless transmission device and an amount of the test power actually received by the terminal;
    establishing a connection with the terminal during which power is wirelessly transmitted to the terminal, in response to the amount of test power actually received by the terminal being greater than a reference value; and
    transitioning from the power transmission state to a plug-out state in which the connection to the terminal is terminated, in response to a charging completion message being received from the connected terminal.

2. The method of claim 1, wherein the establishing comprises:
    authenticating the terminal; and
    performing a matching operation with the terminal when the authentication of the terminal is successful.

3. The method of claim 2, wherein the authenticating comprises:
    receiving an authentication request message from the terminal;
    performing the authentication of the terminal in response to the authentication request message; and
    transmitting an authentication success message to the terminal, when the authentication of the terminal is successful.

4. The method of claim 3, wherein the transitioning to the plug-in state comprises transitioning from the idle state to the plug-in state when the authentication request message is received from the terminal.

5. The method of claim 3, wherein the transitioning to the power transmission state comprises transitioning from the plug-in state to the power transmission state, when the authentication of the terminal is successful.

6. The method of claim 2, wherein the matching operation comprises:
    receiving a terminal information message from the terminal;
    transmitting a transmission information message to the terminal; and
    controlling a transmission parameter in response to the terminal information message.

7. The method of claim 2, wherein the wireless transmitting comprises:
    transmitting a plug-in completion message to the terminal when the transmission efficiency is equal to or greater than the reference value.

8. The method of claim 7, wherein the transitioning to the power transmission state comprises transitioning from the plug-in state to the power transmission state, when the plug-in completion message is transmitted to the terminal.

9. The method of claim 1, wherein, in the power transmission state, the following operations are performed:
    transmitting a transmission check message to the terminal at each check interval; and
    receiving, from the terminal, a state information message corresponding to the transmission check message.

10. The method of claim 1, wherein, while the wireless power transmission device is in the plug-out state, the method further comprises:
    transmitting a transmission report message to the terminal; and
    receiving an acknowledgement message in response to the transmission report message from the terminal.

11. The method of claim 1, further comprising:
    transitioning from the plug-out state to the idle state when the broadcast period elapses after the connection to the terminal is terminated.

12. The method of claim 2, wherein, while the wireless power transmission device is in the plug-in state, the method further comprises:
    transitioning to the idle state when the authentication of the terminal fails.

13. The method of claim 7, wherein the wireless transmitting further comprises:
    transitioning to the idle state when the transmission efficiency is less than the reference value.

14. The method of claim 1, further comprising:
    transitioning to the idle state when a terminal interrupt message is received from the terminal in one of the plug-in state, the power transmission state, and the plug-out state.

15. The method of claim 1, further comprising:
    transmitting a source interrupt message to the terminal when an interrupt the wirelessly transmitting of the power occurs in one of the plug-in state, the power transmission state, and the plug-out state; and
    transitioning to the idle state.

16. The method of claim 1, further comprising:
    transitioning to the idle state when a time-out occurs in one of the plug-in state, the power transmission state, and the plug-out state.

17. A method of wirelessly transmitting a power, the method comprising:
    transmitting a Broadcast Message (BM) at each broadcast period;
    authenticating a terminal that receives the BM; and
    wirelessly transmitting power to the terminal when the authentication of the terminal is successful, the wireless transmitting comprising:
        transmitting a test power to the terminal, and in response, receiving an efficiency information message comprising a comparison to an amount of the test power transmitted and an amount of the test power actually received by the terminal; and establishing a connection with the terminal during which power is wirelessly transmitted to the terminal, in response to the amount of test power actually received by the terminal being greater than a reference value.

18. The method of claim 17, further comprising:
transmitting a transmission check message to the terminal at each check interval; and
receiving, from the terminal, a state information message corresponding to the transmission check message.

19. The method of claim 17, further comprising:
interrupting the wireless transmitting of the power when a charging completion message is received from the terminal.

20. The method of claim 17, further comprising:
performing a matching operation with the terminal when the authentication of the terminal is successful.

* * * * *